United States Patent Office 2,917,433
Patented Dec. 15, 1959

2,917,433

STABLE AQUEOUS PAPAIN TOPICAL COMPOSITIONS

Benjamin Goldman, Yorktown Heights, N.Y., assignor to Rystan Company, Mount Vernon, N.Y., a partnership of New York No Drawing. Application April 2, 1956
Serial No. 575,327

6 Claims. (Cl. 167—65)

This invention relates to novel and useful therapeutic compositions, particularly adapted for topical applications to infected human tissue, especially in the treatment of wounds which require debridement. More particularly, this invention relates to novel stable proteolytic compositions containing papain as an active ingredient, said papain being incorporated in the composition in such a way that it retains full activity in storage and becomes immediately active on coming in contact with tissue requiring dissolution.

Prior to this invention proteolytic enzymes, principally trypsin, streptokinase-streptodornase and papain have been usefully applied to wounds in which healing was impeded by an accumulation of necrotic tissue, fibrin and other debris. Under proper circumstances these enzymes digest and dissolve the protein portion of the non-viable wound matter, liquefying the debris and allowing its complete removal from the wound area with consequent improved opportunity for the wound to heal. As topical wound agents these enzymes, though effective when used properly, have intrinsic limitations which have prevented their practical employment on a broader basis.

Trypsin and streptokinase-streptodornase in the presence of water or aqueous substances become active. If they are in contact with non-viable protein matter, they digest it as their substrate. If they are not in contact with protein material they spend their proteolytic powers without effect. Whether they digest themselves or simply spend their energy with no substrate is not settled, but it is well established that their proteolytic activity rapidly declines. For this reason it is necessary that these enzymes be stored in a dry state. They must be supplied in a dry powder and applied to wounds as such; or they may be made into fresh solutions or ointments and used immediately. Likewise it will be seen that, when these enzymes come in contact with fluids either of wounds or of solutions and ointments, they are stimulated to activity whether in contact with wound debris or not. Thus all the powdered enzyme applied to a wound which comes in contact with exudate of any kind becomes activated and runs its course of activity. The result is that there is a drastic amount of activity which takes place in a relatively short space of time. This means that a physician who institutes treatment with one of these enzymes must plan to be present during the whole time of treatment and must wash out the treated wound when he considers debridement far enough advanced. These characteristics have thus made the enzymes somewhat inconvenient to apply and have limited them almost exclusively to office treatment with doctors in attendance.

Papain requires an "activator" in addition to an adequate quantity of water or aqueous fluids to produce proteolytic effects. It is not completely settled how the activator operates, some investigators believing that the essential element is its reducing activity, others believing that it removes heavy metals which otherwise inhibit papain activity. Whatever the mechanism, however, when activators are mixed with papain, as is common, the mixture acts essentially like trypsin or streptokinase-streptodornase. In other words, "activated" papain has the general characteristics of and the same practical limitations as trypsin and streptokinase-streptodornase.

Compositions containing papain without added activator have been used heretofore in treating wounds. In such cases, the production of the desired proteolytic effect is dependent upon the natural presence of an activator in the treated wound. This technique is not desirable, however, since in a large percentage of wounds activators are not present. Thus, the papain remains inactivated and remains innocuous so as to produce no proteolytic activity. It is seen, therefore, that such compositions, although stable during storage because of the exclusion of an added activator, possess the great practical drawback of being totally ineffective in a large percentage of cases.

From the foregoing, it is seen that heretofore it has not been possible to produce a stable proteolytic composition which is highly effective and in which the active proteolytic enzyme retains full activity in storage and becomes immediately active on coming in contact with tissues requiring dissolution.

Objects and advantages of the invention will be set forth in part hereinafter and in part will be obvious herefrom, or may be learned by practice with the invention, the same being realized and attained by means of the compositions and methods pointed out in the appended claims.

The invention consists in the novel compositions and methods herein described.

Accordingly, it is an object of this invention to provide novel non-toxic therapeutic proteolytic compositions which are highly effective in the treatment of wounds requiring debridement. Another object of this invention is to provide novel therapeutic proteolytic compositions which are stable so as to retain their full activity in storage and which become immediately active on coming into contact with tissues requiring debridement. Another object of this invention is to provide stable, proteolytic prepared compositions which permit practical use of a proteolytic enzyme in topical treatment of wounds by the utilization of an ointment or solution form of medication so as to eliminate the heretofore inconvenient technique of preparing the proteolytic composition at the time of application. Another object of this invention is to provide novel therapeutic proteolytic compositions wherein the proteolytic enzyme become activated only when in contact with protein matter which requires digestion. A still further object of this invention is to provide stable, practical proteolytic compositions containing a water phase whereby the proteolytic enzyme is adequately dispersed throughout the compositions and whereby the compositions are effective under all circumstances, on dry wounds as well as exudative ones. A still further object of this invention is to provide novel proteolytic compositions, stable in storage and effective in use, which may be safely applied to wounds requiring debridement without causing an irritating effect on application thereof. Yet a further object of this invention is to provide a novel method for producing proteolytic compositions having the attributes set forth in the foregoing objects.

In accordance with this invention, it has been found that the foregoing objects may be realized by providing a composition containing a water phase wherein the principal ingredients are papain, urea and a boron containing agent thoroughly dispersed throughout the composition. Surprisingly, such compositions containing the combination of papain and urea, and a boron containing agent have been found to be stable in storage, uniformly and immediately active upon application to wounds and possess a safe, prolonged activity.

The urea of the present composition functions as a special, limited activator of the papain ingredient, exerting its activating effect only when both ingredients are in contact with digestible protein matter present in wounds. The boron containing agent acts as a stabilizer for the urea ingredient in the presence of a water phase. It is essential that the compositions of the present invention contain an adequate amount of water to accomplish uniform, thorough dispersion of the papain and urea throughout the mass. Such uniform and thorough dispersion of the papain and urea is an essential requirement in obtaining the desired results, since it has been found that both must be present together if the desired activity against proteins is to occur. Moreover, as indicated heretofore, papain is activated only in the presence of water or equivalent fluids. Hence, in treating wounds not of the exudative type, the essential water is provided by the water phase of the ointment base or by a water solution. Hence, the presence of water in the composition base in addition to providing a uniform and thorough dispersion of the papain is also essential so that the ointment will be effective under all circumstances, on dry wounds as well as exudative ones. Generally, an adequate amount of water for such purposes is when water is present in an amount at least 10% by weight of the total composition.

While this invention is not to be construed as limited to any theory of action, one possible explanation is that the urea denatures proteins or adducts them in such a manner that the proteins provide for the papain the substance required for its proteolytic activation. In this manner, as urea and papain come into contact with suitable protein substrate, the urea alters the protein so that the papain is stimulated to digest it.

In any event, regardless of the exact theory of action, it has been found that urea combined with papain in the presence of water provides a practical composition of high potential activity which, when applied to wounds exerts a uniform high proteolytic activity. It is seen, therefore, in contrast to trypsin, streptokinase or "activated" papain, that the papain as used in accordance with this invention is not stimulated wherever moisture is present, but acts only in the local area in which it is in contact with digestible protein. Thus, the total activity of all the medication applied to the wound is not simultaneously activated and spent. That part of the medication not in contact with digestible protein retains its potential activity until it in time comes in contact with its proper substrate. In contrast to trypsin, streptokinase-restptodornase and "activated" papain, this composition may be applied to a wound and allowed to remain several days, until the next dressing. Thus, use of the proteolytic enzyme in this case becomes a simple procedure which can be quickly and safely handled. The doctor does not need to remain in immediate attendance during the debriding process, as has been the case heretofore.

It has been further found that although urea is most desirable as an activator for papain to provide compositions having the aforementioned desirable characteristics, such compositions after a time tend to become unstable unless there is present therein a boron containing agent. This instability appears to be due to the enzyme action of urease, an enzyme which is present in vegetable matter such as papain, on urea causing it to break down to ammonia. Surprisingly, however, it has been found that a water soluble boron containing agent will inactivate the undesirable enzyme action of urease on urea which otherwise would inactivate it or break it down to ammonia but advantageously exhibits no inhibiting action on the desired proteolytic action of papain. The boron containing agent may comprise a single boron containing compound or a combination of boron containing compounds which will impart to the composition the desired pH, preferably in the range of pH 5 to 7. Examples of suitable boron containing compounds for this purpose are boric acid ($H_3BO_3$), sodium borate ($Na_3BO_3$), pyroboric acid ($H_2B_4O_7$), sodium pyroborate ($Na_2B_4O_7$), monosodium borate ($NaH_2BO_3$), metaboric acid ($HBO_2$) and sodium metaborate ($NaBO_2$).

Moreover, it has been found that the water, papain, urea and boron containing agent must be in certain proportions if the desired results are to be obtained. In general water must be present in an amount of at least 10% by weight of the total composition if the remaining ingredients are to be uniformly and thoroughly dispersed throughout the composition. The maximum amount of water present will vary depending upon whether or not the composition is in the form of an ointment or a solution. In general in ointments, the water content varies between 5 to 50% by weight of the composition. Any suitable ointment carrier may be used such as lanolin, "Carbowax" (polymers of ethylene glycol) and the like. In solutions, the water content generally varies from 50 to 89.5% by weight of the total composition.

The effective ratio of papain to urea is generally in the range of 1 part by weight papain to ½ to 2 parts of urea. If the urea is in an amount less than one half of the papain present, there may be present insufficient urea to insure activity of the papain. On the other hand, if urea is in an amount greater than double the papain, the high concentration of urea tends to lessen the effectiveness of the papain. In general, papain is present in an amount from about 5 to 25% by weight of the total composition, and preferably 5 to 15% by weight. Urea is generally in an amount of from 5 to 25% by weight of the total composition, and preferably 5 to 15% by weight, the ratio of urea to papain being in the range from ½–2 parts to 1 part as indicated hereinabove.

In general, the boron containing agent is in an amount from 0.5 to 10% by weight of the total composition and preferably from about 1% to an amount above which the boron containing agent will not be soluble in the water phase of the ointment or solution, which is generally about 4%. The boron containing agent should be in an amount sufficient to impart its stabilizing action against urea breakdown but should not be in such an amount to cause toxic effects. Accordingly, the boron containing agent may be in excess over that required to form a saturated solution but this is not preferred since the non-solubilized portion detracts from the appearance of the ointment or solution.

It has also been found that the pH of the compositions of the present invention should not exceed 7 and preferably have a pH in the range of 5 to 7, the optimum activity of papain being about at pH 5.5. Above pH 7.0 urea is not stable and will to some extent decompose, liberating ammonia to form ammonium hydroxide, which may be irritating. As mentioned hereinbefore, since the urea is the activator for the papain it is essential that it remain stable in order to effect the desired proteolytic activity. The boron containing agent used in accordance with the present invention not only acts as a stabilizer in preventing urea breakdown but also maintains the desired pH concentration whereby the papain is most effective.

In treating wounds which require debridement, some of the end products of proteolysis are muco-protein materials, which often produce an irritating action and other deleterious actions on the tissue in contact with said end products. In order to control such undesirable effects, it has been found desirable to incorporate in the compositions of the present invention a small amount of a water-soluble chlorophyll, generally in an amount in a range of 0.05 to 1% by weight of the total composition, and preferably in an amount of 0.1% to 0.5%. The water-soluble chlorophyll does not interfere with the desired proteolytic action of papain, activating action of urea or stabilizing action of the boron containing agent, but advantageously inhibits the deleterious action of the muco-protein end products resulting from proteolysis. It has been found that the water soluble chlorophyll should be added to the water phase before urea and the boron containing agent in order to insure the chlorophyll going into solution. Adding the boron containing agent and urea prior to chlorophyll appears to interfere with chlorophyll going into solution. The water-soluble chlorophylls which may be used for the aforementioned purpose are exemplified by those disclosed in Gruskin patent U.S. Patent No. 2,120,667, including especially sodium or potassium copper chlorophyllin, sodium or potassium magnesium chlorophyllin and sodium or potassium iron chlorophyllin. The preferred water-soluble chlorophyll for this purpose is the commercial form now available in high purity, which is a mixture of sodium and potassium copper chlorophyllin, predominantly the potassium salt.

To illustrate the preparation of the novel proteolytic ointments of the present invention, the following examples are given. Unless indicated otherwise, the amounts indicated are by weight. It should be realized that the following examples are given merely for the purpose of illustrating the present invention, and the invention should not be considered limited thereto.

*Example I*

A solution in accordance with this invention may be prepared as follows:

10 grams of papain powder (Brown-Ceylon) are added to 78.6 cc. of water and thoroughly mixed. 10 grams of urea crystals are added to this mixture and thoroughly mixed until the urea crystals are completely dissolved. Then 1.0 gram of boric acid and 0.33 gram of sodium borate are added to the solution to produce a solution having a pH of 6.1.

*Example II*

A solution in accordance with this invention may be prepared as follows:

10 grams of papain powder (White African) are added to 69.5 cc. of water and thoroughly mixed. The mixture is then filtered through No. 1 filter paper to remove particulate material. 20 grams of urea crystals are added to the filtrate and thoroughly mixed until the urea crystals are completely dissolved. Then 1.5 grams of boric acid are added to the solution to produce a solution having a pH of 5.5.

*Example III*

A solution in accordance with this invention may be prepared as follows:

0.1 gram of sodium copper chlorophyllin is added to 82.9 cc. of water and thoroughly mixed until the chlorophyllin dissolves. 10 grams of papain powder (Brown-Ceylon) are added to the aqueous chlorophyllin solution. 5 grams of urea crystals are added to this mixture and thoroughly mixed until the urea crystals are dissolved. Then 1.5 grams of boric acid and 0.5 gram of sodium borate are added to the solution to produce a solution having a pH of 6.1.

*Example IV*

An ointment in accordance with this invention is prepared as follows:

10 grams white petrolatum, 1 gram of polyoxyethylene stearate manufactured by Atlas Powder Corporation, Wilmington, Delaware, and sold under the trade name "MYRJ 52," 10 grams of stearyl alcohol and 0.6 gram of chlorobutanol are thoroughly mixed together in a suitable container and heated to about 70° C.

35.62 cc. of water, 21 grams of propylene glycol, 10 grams of papain powder (Brown-Ceylon), 10 grams of urea crystals, 1.0 gram of boric acid and 0.33 gram of sodium borate are thoroughly mixed together in a second container and heated up to 55° C.

The mixture in the first container is cooled to 55° and is then slowly added to the mixture in the second container with agitation of the resulting mixture. On cooling an ointment results having a pH of 6.1.

*Example V*

An ointment in accordance with this invention is prepared as follows:

10 grams white petrolatum, 1 gram of polyoxyethylene stearate manufactured by Atlas Powder Corporation, Wilmington, Delaware, and sold under the trade name "MYRJ 52," 10 grams of stearyl alcohol and 0.6 gram of chlorobutanol are thoroughly mixed together in a suitable container and heated to about 70° C.

0.5 gram of sodium copper chlorophyllin are added to 35.57 cc. of water in a second container and the mixture is mixed thoroughly until the chlorophyllin is dissolved. To this mixture are added 21 grams of propylene glycol, 10 grams of papain powder (White African), 10 grams of urea crystals, 1.0 gram of boric acid and 0.33 gram of sodium borate and the resulting mixture is thoroughly mixed and heated up to 55° C.

The mixture in the first container is cooled to 55° and is then slowly added to the mixture in the second container with agitation of the resulting mixture. On cooling an ointment results having a pH of 6.1.

The invention in its broader aspects is not limited to the specific compositions shown and described but departures may be made therefrom within the scope of the accompanying claims without departing from the principles of the invention and without sacrificing its chief advantages.

What is claimed is:

1. A stable, proteolytic composition for use in treating wounds which require debridement comprising papain in an amount from about 5 to about 25% by weight, urea in an amount from about 5 to about 25% by weight, water in an amount at least about 5% by weight, and a boron containing agent selected from the group consisting of boric acid, sodium borate, pyroboric acid, sodium pyroborate, monosodium borate, metaboric acid, sodium metaborate and mixtures of the foregoing in an amount from about 0.5 to about 10% by weight, said urea being in an amount from about ½ to about 2 parts by weight per part of papain.

2. A stable, proteolytic composition according to claim 1 in the form of an ointment wherein water is present in an amount from about 5 to about 50% by weight.

3. A stable, proteolytic composition according to claim 1 in the form of a solution wherein water is present in an amount from about 50 to about 89.5% by weight.

4. A stable, proteolytic composition according to claim 1 wherein the pH of said composition is in the range of from about 5 to about 7.

5. A stable, proteolytic composition according to claim 1 containing a water soluble chlorophyll in an amount from about 0.1 to about 0.5% by weight.

6. A stable, proteolytic composition for use in treating of wounds which require debridement comprising water in an amount of at least 10% by weight of the total composition, papain in an amount of from about 5 to 15% by weight, urea in an amount of from 5 to 15% by weight and a water-soluble, non-toxic boron containing agent in an amount from about 1% to 4% by weight, urea being present in an amount ½ to 2 parts by weight per part of papain.

References Cited in the file of this patent

FOREIGN PATENTS 129,555   Australia _____ Oct. 20, 1948

OTHER REFERENCES

Tremble: Canadian Med. J., 40, February 1939, pp. 149–153.

Sumner et al.: "Chem. and Methods of Enzymes," Academic Press, N.Y., 1953, p. 41.

Robinson: Urea in Purulent Wounds, Am. J. of Surgery, New Ser., vol. XXXIII, No. 2, p. 196, August 1936.

Hwang: Annals, N.Y. Acad. Sci., 54:2, May 1951, pp. 192 and 193.

Merck Index, 6th ed., 1952, p. 156.

Drug Trade News, Mfg. Sect., September 1951, p. 60.